No. 883,642. PATENTED MAR. 31, 1908.
A. W. HIGHT.
SPIRIT LEVEL.
APPLICATION FILED JULY 8, 1907.
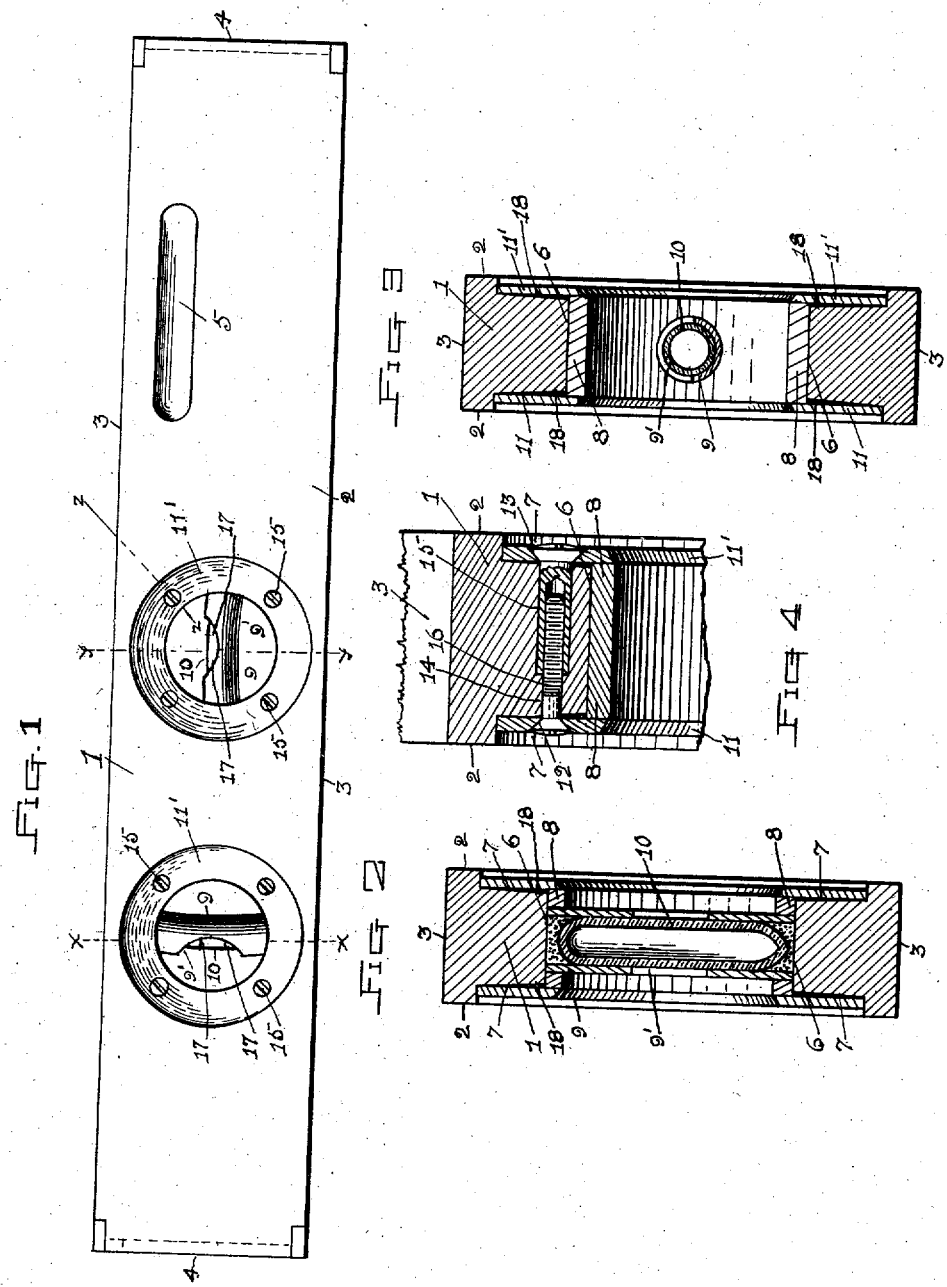

UNITED STATES PATENT OFFICE.

ALBERT W. HIGHT, OF BALLARD, WASHINGTON, ASSIGNOR TO HUGH G. MONEN, OF TOLEDO, OHIO.

SPIRIT-LEVEL.

No. 883,642.　　　Specification of Letters Patent.　　　Patented March 31, 1908.

Application filed July 8, 1907. Serial No. 382,633.

*To all whom it may concern:*

Be it known that I, ALBERT W. HIGHT, a citizen of the United States, residing at Ballard, in the county of King and State of Washington, have invented a new and useful Improvement in Spirit-Levels, of which the following is a specification.

My invention relates to a spirit level, and has for its object to provide a convenient instrument of the kind, that is of simple and inexpensive construction and wherein the bubble glass is readily adjustable to accurately locate the plane of the bubble between indicating lines of the glass and parallel with planes of the body of the instrument, whereby whenever the plane of the bubble is located between the indicating lines, the planes of the body that are parallel therewith are also horizontal.

A further object is to provide an instrument of the kind having one or more bubble tubes that may be readily and accurately adjusted therein to adapt the instrument for convenient and accurate use for either leveling or plumbing or both combined.

I accomplish these objects by the construction and combination of parts as hereinafter described, claimed and illustrated in the drawings, in which Figure 1 is a view in side elevation of a spirit level constructed in accordance with my invention. Fig. 2 is an enlarged cross section of Fig. 1 on line $x$—$x$. Fig. 3 is a cross section of Fig. 1 on line $y$—$y$, and Fig. 4 is an enlarged broken away cross section on line $z$—$z$ of Fig. 1.

In the drawings 1 designates the elongated rectangular body of my instrument, of suitable length and having greater breadth than thickness, and having the parallel sides 2, the parallel sides 3 at right angles to the sides 2, and the parallel ends 4 at right angles to the sides 2 and 3.

The sides 3 are each provided with a grip groove 5, located opposite each other in the sides, and central of the body 1 is provided a bore 6 through the sides 2, and the bore is counterbored to form the shallow annular recesses 7.

In the bore 6 is inserted a ring 8, of an outer diameter to move freely but closely within the bore, the ring being of a width slightly greater than the thickness of the body 1 between the recesses 7, and at diametric points of the ring are provided opposite bores of suitable diameter, in which is secured diametric of the ring, a guard tube 9, slightly arched between the sides of the ring and provided with an elongated oval shaped sight opening 9' formed by cutting away the central portion of the tube at the top of the arch. Through the tube 9 is inserted a sight glass tube 10 which is closed at the ends and partly filled with spirit, so as to form an inclosed air bubble of suitable dimensions and shape in the glass opposite the incut 9', when the tube is placed in a horizontal position. The tube after being thus inserted is secured in position by filling the outer end portion of the tube 9 with plaster of paris flush with the outer ends of the tube which are made flush with the periphery of the ring.

The recesses 7 of the body 1 are provided with the annular plates 11 and 11', each of which is of an outer diameter to fit into the recess and has an inner diameter slightly less than the outer diameter of the ring 8. The plate 11 is provided with the countersunk screw orifices 12 located at regular intervals of the plate, and the plate 11' is provided with the enlarged screw orifices 13, adapted to be brought by adjustment of the plate opposite and in axial alinement with the orifices 12 of the plate 11.

The body 1 within the recesses 7 is provided with the transverse orifices 14, which adjacent to the plate 11 are of a diameter to register with the screw orifices 12 of the plate 11, and from the plate 11' towards the plate 11, the orifices 14 are counterbored to the diameter of the orifices 13 of the plate 11'. In the orifices 13 and the enlarged portion of the orifices 14 are inserted the screws 16 which are run into the bolts 15 and through the orifices 12 are inserted the screws 16 which are run into the bolts 15 until the ring plates 11 and 11' are drawn loosely against the sides of the body 1 within the recesses. The body 1 being then placed on a known level plane the central ring 8 is turned in the bore 6 until the incut 9' of the tube 9 is uppermost and the bubble of the tube 10 is between the index lines 17 marked circumferentially on the tube 10.

When adjusted in this position the screws 16 are run into the screw bolts 15 until the plates 11 and 11' are drawn tightly against the body 1 at their outer circumferential portion, and against the ring 8 at their inner portion in which position the ring 8 is frictionally locked against turning in the bores 6 and the instrument is then adjusted for leveling.

When the instrument is to be used for both a level and a plummet, the body 1 is also provided with another bore 6 having counterbored recesses 7, which is preferably located at a point between the central bore 6 and the end 4 farthest from the grip grooves 5. This bore 6 is also equipped with a ring 8 having a guard tube 9, a bubble 10, and the annular plates 11 and 11', which are secured in like manner as in the central bore 6, and the ring 8 is in like manner adjusted and secured with the bubble between the indicating lines 17 when the end of the body 1 nearest the grip groove 5 is resting on a level plane or when its base plane 3 is resting against a vertical plane with the arch of the tube 9 uppermost. Thus adjusted the instrument may be conveniently used either for plumbing or leveling.

To insure pressure of the annular plates 11 and 11' on the edges of the rings 8, the bottoms 18 of the counterbores 7 are slightly dished inwards towards the orifice 6 whereby when the screws 16 and the bolts 15 are tightened on the plates 11 and 11', the outer portion of the plates are pressed on the body 1 and the inner portions on the edges of the ring 8, whereby the ring 8 is rigidly held against turning in the bore 6.

By the simple and inexpensive construction shown and described, I have produced a convenient instrument which is readily adjustable for accurate use either as a level or plummet, or for both purposes.

What I claim to be new is

1. In a level, the combination with a body having a plane base, and a counterbored transverse orifice parallel to the plane base, of a ring rotatably mounted in the orifice, an arched bubble sight tube secured diametrically of the ring, annular plates in the counterbores, and clamping screws extending through the annular plates and the body, adapted to press the plates oppositely on the body and the ring.

2. In a level, the combination with a body having a plane base, and a counterbored transverse orifice parallel to the plane base, of a ring rotatably mounted in the orifice, an arched guard tube secured diametrically through the ring, the tube being provided with a sight opening in the top of the arch, a closed sight tube partly filled with spirit and arched to conform to the guard tube and secured therein with the top of the arch of the sight tube opposite the opening of the guard tube, and provided with index lines, annular plates in the counterbores, and clamping screws extending through the annular plates and the body adapted to press the plates oppositely on the body and the ring.

In witness whereof, I have hereunto signed my name in the presence of two subscribing witnesses, this 21st day of June, 1907.

ALBERT W. HIGHT.

In presence of—
N. A. MONGHLER,
WM. J. FRITSCHE.